United States Patent
Sternin et al.

(10) Patent No.: US 6,789,082 B2
(45) Date of Patent: Sep. 7, 2004

(54) METHOD AND APPARATUS TO FACILITATE FAST NETWORK MANAGEMENT PROTOCOL REPLIES IN LARGE TABLES

(75) Inventors: Jeffrey Y. Sternin, San Jose, CA (US); Steven C. Tung, Castro Valley, CA (US); Yongping Qi, Fremont, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 134 days.

(21) Appl. No.: 09/905,346

(22) Filed: Jul. 13, 2001

(65) Prior Publication Data

US 2003/0023605 A1 Jan. 30, 2003

(51) Int. Cl.[7] .............................................. G06F 17/30
(52) U.S. Cl. ............................. 707/100; 707/2; 707/3; 707/10; 707/101; 707/103 R; 345/326; 709/224
(58) Field of Search ......................... 707/10, 100, 103, 707/104.1, 1, 2, 3, 4, 5, 6, 101, 103 R, 103 Y, 200, 201, 203, 204; 709/217, 224, 226, 228, 203, 209, 218, 220, 221, 223, 225, 232, 236, 238, 243; 345/700, 326, 635, 719, 733; 705/5, 8, 9, 10, 37

(56) References Cited

U.S. PATENT DOCUMENTS

| | | | | |
|---|---|---|---|---|
| 5,929,848 A | * | 7/1999 | Albukerk et al. | ............ 345/700 |
| 6,076,107 A | * | 6/2000 | Chen et al. | ................. 709/224 |

* cited by examiner

*Primary Examiner*—Shahid Alam
*Assistant Examiner*—Fred Ehichioya
(74) *Attorney, Agent, or Firm*—Silicon Valley IP Group, PC; Kevin J. Zilka; Christopher J. Hamaty

(57) ABSTRACT

One embodiment of the present invention provides a system that facilitates fast network management protocol replies in large tables. The system operates by first receiving a request for a next row from a network management protocol table. The system then compares the object identifier in the request with a pre-calculated object identifier. If the object identifier matches the pre-calculated object identifier, the system responds to the request with a pre-calculated response. If the object identifier does not match the pre-calculated object identifier, the system searches a management information base for the next row in the network management protocol table. Next, the system calculates a response, which includes data from requested columns of the next row. The system then responds to the request.

11 Claims, 2 Drawing Sheets

METHOD AND APPARATUS TO FACILITATE FAST NETWORK MANAGEMENT PROTOCOL REPLIES IN LARGE TABLES

RELATED APPLICATION

The subject matter of this application is related to the subject matter in a co-pending non-provisional application by Jeffrey Y. Sternin entitled, "Method and Apparatus to Facilitate Accessing Network Management Protocol Tables," having Ser. No. 09/911,887, and filing date Jul. 23, 2001.

BACKGROUND

1. Field of the Invention

The present invention relates to computer network management. More specifically, the present invention relates to a method and an apparatus that facilitates fast network management protocol replies in large tables.

2. Related Art

Network management database servers typically maintain tables related to network traffic. For example, a network management database server can maintain a table for transactions, which includes columns for a source Internet protocol (IP) address, a destination IP address, number of packets transmitted, and number of octets, or 8-bit bytes, transmitted. In general, the network management database server can maintain multiple tables, wherein each table includes columns for different sets of data.

An operator typically uses a network management protocol, for example simple network management protocol (SNMP) to access data within these tables. The operator first forms a request for the needed data at a console. This request is then passed to an agent within the network management database server. In many cases, the operator desires to repeatedly retrieve data from the next row in the table without knowing what that row is or where it is located. To facilitate this type of access, the network management protocol includes a method, called GetNext, to query the next row after a given row. In fact, GetNext can be used to access the first row within the table as well.

Consider Table I as an example. The operator can issue the following request from a console to access data in columns 1 and 2 of the first row:

GetNext OID(0,1) Val=0, OID(0,2) Val=0 where OID is the object identifier and Val is the value. In this request, the operator wants the value in column 1 of the row following row 0, OID(0,1)), and the value in column 2 of the row following row 0, (OID(0,2)).

TABLE I

| (TA) | | |
|---|---|---|
| | Column 1 | Column 2 |
| Row 1 | TA(1,1) | TA(1,2) |
| Row 2 | TA(2,1) | TA(2,2) |
| Row 3 | TA(3,1) | TA(3,2) |
| . | | |
| . | | |
| . | | |
| Row N | TA(N,1) | TA(N,2) |

This request is encoded in a protocol data unit (PDU). Upon receiving the request, the agent first decodes the OID within the PDU. Next, the agent searches for a matching OID in a management information base (MIB). The MIB is typically implemented as an ordered binary tree, and can be traversed using well-known techniques. After finding the matching OID in the MIB, the agent retrieves the requested data from the table. Next, the agent constructs an output PDU and encodes it with the requested data. Finally, the agent sends the output PDU to the requesting console. This output PDU includes OID(1,1) Val=TA(1,1), OID(1,2) Val= TA(1,2) indicating that the next row is row 1 and the values in columns 1 and 2 are TA(1,1) and TA(1,2) respectively.

As an additional example, consider Table 2. If the operator enters the following request at a console:

GetNext OID(99,4) Val=0, OID(99,2) Val=0,

The agent responds with OID(100,4) Val=TB(100,4), OID (100,2) Val=TB(100,2).

TABLE 2

| (TB) | | | | |
|---|---|---|---|---|
| | Column 1 | Column 2 | Column 3 | Column 4 |
| Row 1 | TB(1,1) | TB(1,2) | TB(1,3) | TB(1,4) |
| Row 2 | TB(2,1) | TB(2,2) | TB(2,3) | TB(2,4) |
| . | | | | |
| . | | | | |
| . | | | | |
| Row 100 | TB(100,1) | TB(100,2) | TB(100,3) | TB(100,4) |
| Row 101 | TB(101,1) | TB(101,2) | TB(101,3) | TB(101,4) |
| . | | | | |
| . | | | | |
| . | | | | |
| Row N | TB(N,1) | TB(N,2) | TB(N,3) | TB(N,4) |

To summarize, when using GetNext, the agent responds with the data from the requested columns in the row following the identified row.

This procedure works well when the tables are small, however, as the tables grow larger, the time to locate the next item can become excessively long. Consider, for example, a table with 100,000 rows and an access time of 30 milliseconds per row. To search the table for the last item takes 300 seconds, with an average time over all items of 150 seconds. A delay of this length can degrade productivity and can cause frustration on the part of the operator.

What is needed is a method and an apparatus, which allows the operator to access the next row in very large tables while minimizing the delay described above.

SUMMARY

One embodiment of the present invention provides a system that facilitates fast network management protocol replies in large tables. The system operates by first receiving a request for a next row from a network management protocol table. The system then compares the object identifier in the request with a pre-calculated object identifier. If the object identifier matches the pre-calculated object identifier, the system responds to the request with a pre-calculated response. If the object identifier does not match the pre-calculated object identifier, the system searches a management information base for the next row in the network management protocol table. Next, the system calculates a response, which includes data from requested columns of the next row. The system then responds to the request.

In one embodiment of the present invention, when the system receives a request for the next row from the network management protocol table, the system locates the protocol data unit in the request and determines the object identifier within the protocol data unit.

In one embodiment of the present invention, before responding to the request with either the pre-calculated response or with the newly calculated response, the system selects a candidate next row in the network management protocol table. The system then creates a pre-calculated object identifier for the candidate next row and saves the pre-calculated object identifier. The system also creates a pre-calculated response for the candidate next row, which includes data from requested columns of the candidate next row, and saves the pre-calculated response.

In one embodiment of the present invention, the system determines the next row in the network management protocol table by first decoding the object identifier in the protocol data unit. The system then searches for the object related to the object identifier in the management information base.

In one embodiment of the present invention, the request is one of a series of related requests.

In one embodiment of the present invention, saving the pre-calculated object identifier includes saving the pre-calculated object identifier in a table of pre-calculated object identifiers, so that pre-calculated object identifiers can be saved for more than one series of related requests.

In one embodiment of the present invention, saving the pre-calculated response includes saving the pre-calculated response in a table of pre-calculated responses, so that pre-calculated responses can be saved for more than one series of related requests.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Consoles Coupled to a Network Management Database Server

Figure 1:
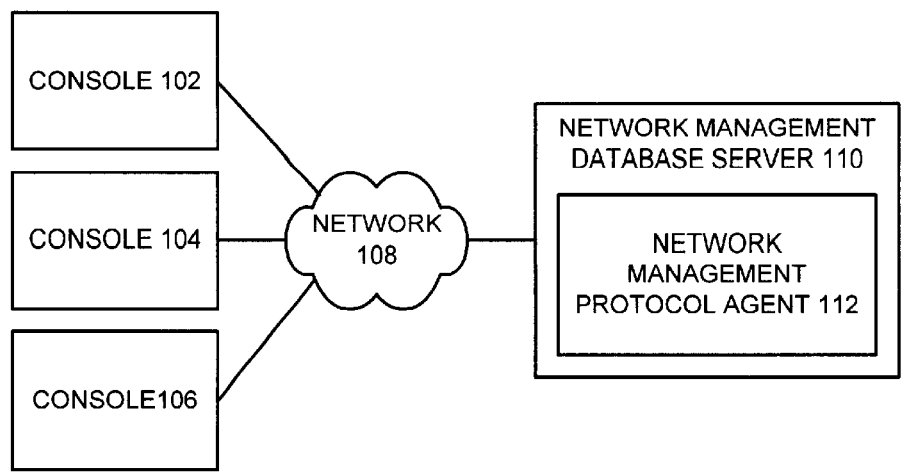
FIG. 1 illustrates consoles coupled to network management database server 110 in accordance with an embodiment of the present invention.

FIG. 1 illustrates consoles coupled to network management database server 110 in accordance with an embodiment of the present invention. Consoles 102, 104, and 106 are coupled to network management database server 110 across network 108.

Consoles 102, 104, 106 and network management database server 110 can generally include any type of computer system, including, but not limited to, a computer system based on a microprocessor, a mainframe computer, a digital signal processor, a portable computing device, a personal organizer, a device controller, and a computational engine within an appliance. Consoles 102, 104, and 106 are representative of consoles coupled to network management database server 110. In operation, there can be more or less consoles than the number shown.

Network 108 can generally include any type of wire or wireless communication channel capable of coupling together computing nodes. This includes, but is not limited to, a local area network, a wide area network, or a combination of networks. In one embodiment of the present invention, network 108 includes the Internet.

Network management database server 110 includes network management protocol agent 112. Operators communicate with network management protocol agent 112 using consoles 102, 104, and 106 as described below in conjunction with FIGS. 2 and 3.

Network Management Protocol Agent

Figure 2:
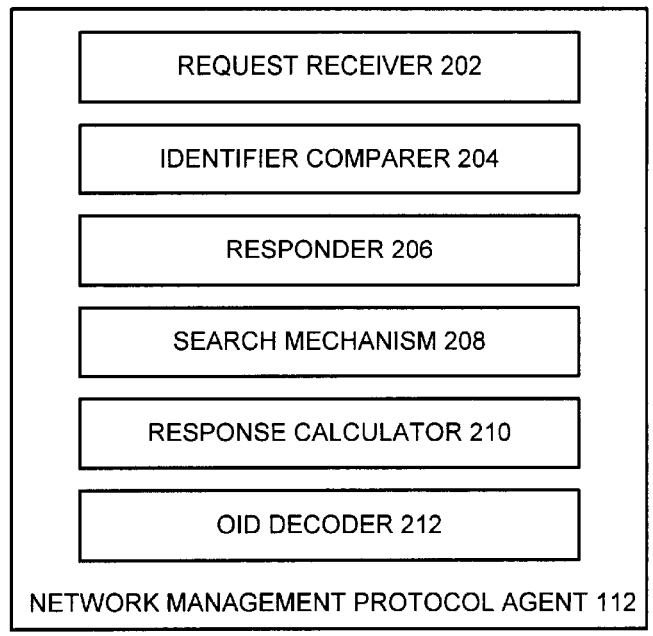
FIG. 2 illustrates network management protocol agent 112 in accordance with an embodiment of the present invention.

FIG. 2 illustrates network management protocol agent 112 in accordance with an embodiment of the present invention. Network management protocol agent 112 includes request receiver 202, identifier comparer 204, responder 206, search mechanism 208, response calculator 210, and object identifier (OID) decoder 212.

Request receiver 202 receives requests from consoles 102, 104, and 106. These requests include object identifiers within protocol data units. Some of these requests, for example the simple network management protocol (SNMP) requests "GetNext" and "GetBulk", identify the desired data indirectly as described above in the related art section.

Network management protocol agent 112 identifies these indirect requests and uses identifier comparer 204 to determine if the object identifier within the protocol data unit matches a pre-calculated identifier stored within the system. Generation of the pre-calculated identifier and its associated pre-calculated response are described below. If identifier comparer 204 determines that the object identifier matches the pre-calculated identifier, network management protocol agent 112 uses responder 206 to respond with the associated pre-calculated response.

If identifier comparer 204 determines that the object identifier does not match the pre-calculated identifier, network management protocol agent 112 uses OID decoder 212 to decode the object identifier into its component parts. Next, network management protocol agent 112 uses search mechanism 208 to search a management information base to find the location of the requested data. After finding the requested data, response calculator 210 encodes the output protocol data unit. The output data unit is sent by responder 206 in response to the request.

Prior to responding to the request, network management protocol agent 112 pre-calculates the object identifier for the next row in the table and pre-calculates the associated response. Since the current row has already been located, determining the next row in the management information base is simply a matter of stepping to the next row. Typically, the management information base is a tree structure; therefore, finding the next row involves simply performing the next step of an in-order traverse of the tree. Note that encoding the pre-calculated object identifier for the next row is much easier that decoding an object identifier because the field lengths within the object identifier are data dependent. Network management protocol agent 112 uses response calculator 210 to generate the pre-calculated response for the next row.

Both the pre-calculated identifier and the pre-calculated response are saved in tables so that pre-calculated data can be made available for more than one series of requests. For example, console 104 may be generating requests for Table 1 above, while console 102 may be generating requests for Table 2 above. This would constitute two different series of requests. Identifier comparer 204 compares the object identifier within the request with each pre-calculated identifier in turn until a match is found or the list of pre-calculated identifiers is exhausted. Note that this comparison is a very fast operation compared with decoding the identifier using OID decoder 212. If a match is found, decoding the object identifier, and the subsequent search of the management information base, is not necessary. Since these two steps are the most costly in terms of time expended, pre-calculating identifiers and responses for the next row can greatly reduce the response time. Empirical evidence supports a reduction factor in the response time of approximately 20.

Processing a Request

Figure 3:
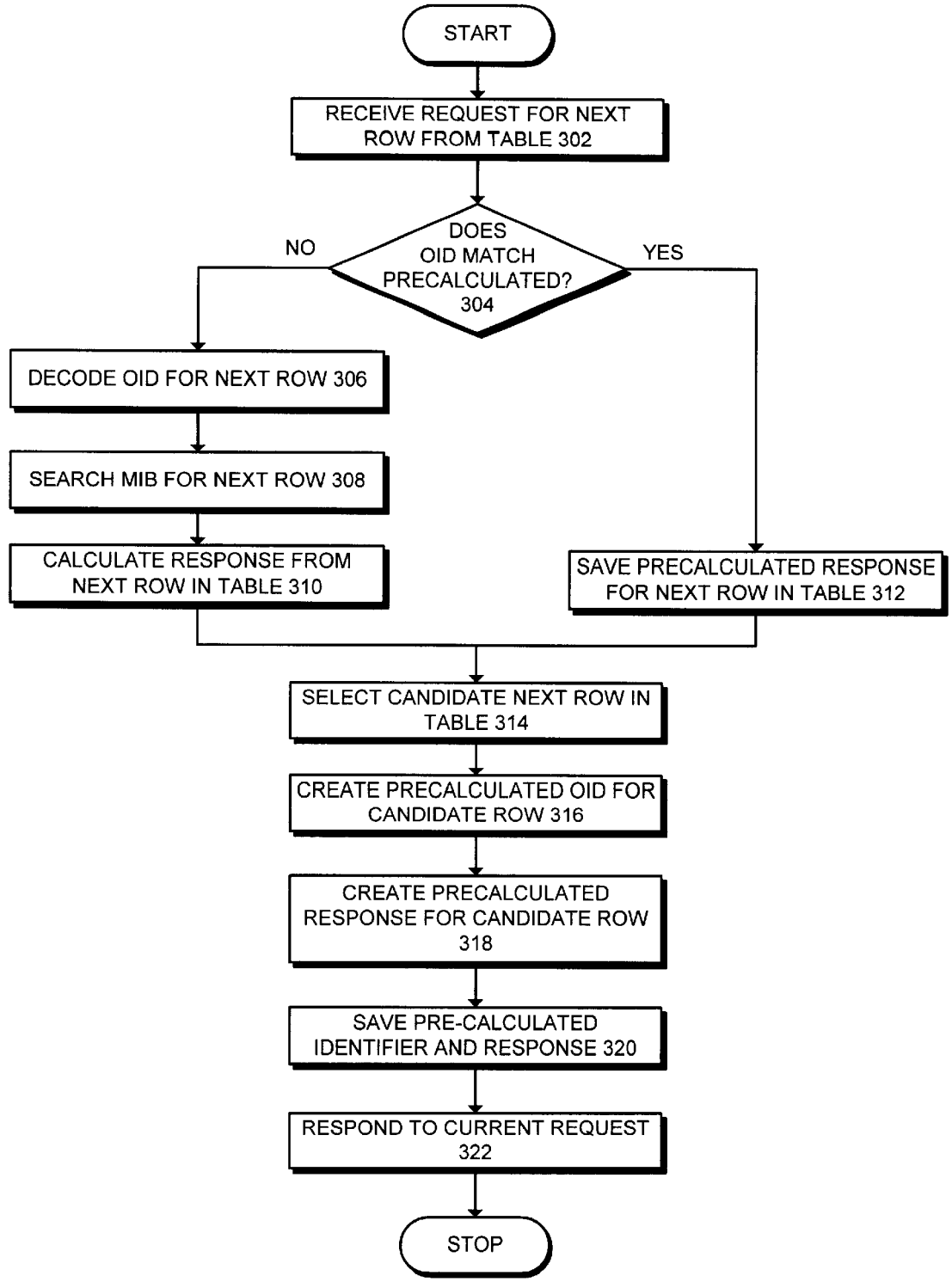
FIG. 3 is a flowchart illustrating the process of responding to a request from a console in accordance with an embodiment of the present invention.

FIG. 3 is a flowchart illustrating the process of responding to a request from a console in accordance with an embodiment of the present invention. The system starts when request receiver 202 receives a request for the next row from a table (step 302). Next, identifier comparer 204 determines if the object identifier within the requesting protocol data unit matches a pre-calculated identifier stored in a table within the system (step 304).

If the object identifier does not match a pre-calculated identifier, OID decoder 212 decodes the object identifier within the protocol data unit to identify the requested next row (step 306). Next, search mechanism 208 search the management information base to locate the requested data (step 308). Response calculator 210 then encodes the output protocol data unit in response to the request (step 310). This response is saved temporarily while the pre-calculated identifier and response are generated as described below.

If the object identifier does match a pre-calculated identifier at 304, network management protocol agent 112 temporarily saves the associated pre-calculated response while a new pre-calculated identifier and response are generated as described below.

After temporarily saving the response in 310 or temporarily saving the pre-calculated response in 312, network management protocol agent 112 selects the candidate next row in the table as described above (step 314). Next, network management protocol agent 112 creates a pre-calculated object identifier for the candidate row (step 316). Response calculator 210 than creates the pre-calculated response for the candidate next row (step 318). Network management protocol agent 112 saves the pre-calculated identifier and pre-calculated response in tables for future requests (step 320). Finally, responder 206 responds to the request with the response that was temporarily saved in 310 or 312 (step 322).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate fast network management protocol replies in large tables, comprising:
   receiving a request for a next row in a network management protocol table;
   comparing an object identifier associated with the network management protocol table in the request with a pre-calculated object identifier; and
   if the object identifier matches the pre-calculated object identifier,
      responding to the request with a pre-calculated response, otherwise
   searching a management information base for the next row in the network management protocol table,
   calculating a response, wherein the response includes data from requested columns of the next row, and
   responding to the request with the response;
   wherein, before responding to the request with the pre-calculated response or responding to the request with the response,
      selecting a candidate next row in the network management protocol table,
      creating the pre-calculated object identifier for the candidate next row,
      saving the pre-calculated object identifier,
      creating the pre-calculated response for the candidate next row, wherein the pre-calculated response includes data from requested columns of the candidate next row, and
      saving the pre-calculated response;
   wherein receiving the request for the next row from the network management protocol table includes:
      locating a protocol data unit in the request; and
      determining the object identifier within the protocol data unit;
   wherein determining the next row in the network management protocol table includes:
      decoding the object identifier in the protocol data unit; and
      searching for an object related to the object identifier in the management information base.

2. The method of claim 1, wherein the request is one of a series of related requests.

3. The method of claim 2, wherein saving the pre-calculated object identifier includes saving the pre-calculated object identifier in a table of pre-calculated object identifiers, whereby pre-calculated object identifiers can be saved for more than one series of related requests.

4. The method of claim 2, wherein saving the pre-calculated response includes saving the pre-calculated response in a table of pre-calculated responses, whereby pre-calculated responses can be saved for more than one series of related requests.

5. A computer-readable storage medium storing instructions that when executed by a computer cause the computer to perform a method to facilitate fast network management protocol replies in large tables, the method comprising:
   receiving a request for a next row in a network management protocol table;
   comparing an object identifier associated with the network management protocol table in the request with a pre-calculated object identifier; and if the object identifier matches the pre-calculated object identifier,
responding to the request with a pre-calculated response, otherwise
searching a management information base for the next row in the network management protocol table,
calculating a response, wherein the response includes data from requested columns of the next row, and
responding to the request with the response;
wherein, before responding to the request with the pre-calculated response or responding to the request with the response,
selecting a candidate next row in the network management protocol table,
creating the pre-calculated object identifier for the candidate next row,
saving the pre-calculated object identifier,
creating the pre-calculated response for the candidate next row, wherein the pre-calculated response includes data from requested columns of the candidate next row, and
saving the pre-calculated response;
wherein receiving the request for the next row from the network management protocol table includes:
locating a protocol data unit in the request; and
determining the object identifier within the protocol data unit;
wherein determining the next row in the network management protocol table includes:
decoding the object identifier in the protocol data unit; and
searching for an object related to the object identifier in the management information base.

6. The computer-readable storage medium of claim 5, wherein the request is one of a series of related requests.

7. The computer-readable storage medium of claim 6, wherein saving the pre-calculated object identifier includes saving the pre-calculated object identifier in a table of pre-calculated object identifiers, whereby pre-calculated object identifiers can be saved for more than one series of related requests.

8. The computer-readable storage medium of claim 6, wherein saving the pre-calculated response includes saving the pre-calculated response in a table of pre-calculated responses, whereby pre-calculated responses can be saved for more than one series of related requests.

9. An apparatus that facilitates fast network management protocol replies in large tables, comprising:
a receiving mechanism tat is configured to receive a request for a next row in a network management protocol table;
a comparing mechanism that is configured to compare an object identifier associated with the network management protocol table in the request with a pre-calculated object identifier;
a responding mechanism that is configured to respond to the request with a pre-calculated response;
a searching mechanism that is configured to search a management information base for the next row in the network management protocol table;
a calculating mechanism that is configured to calculate a response, wherein the response includes data from requested columns of the next row;
wherein the responding mechanism is farther configured to respond to the request with the response;
wherein, before responding to the request with the pre-calculated response or responding to the request with the response, the following operations are carried out:
selecting a candidate next row in the network management protocol table,
creating the pre-calculated object identifier for the candidate next row,
saving the pre-calculated object identifier,
creating the pre-calculated response for the candidate next row, wherein the pre-calculated response includes data from requested columns of the candidate next row, and
saving the pre-calculated response;
a locating mechanism that is configured to locate a protocol data unit in the request;
a determining mechanism that is configured to determine the object identifier within the protocol data unit; and
a decoding mechanism that is configured to decode the object identifier in the protocol data unit;
wherein the searching mechanism is further configured to search for an object related to the object identifier in the management information base.

10. The apparatus of claim 2, wherein the request is one of a series of related requests.

11. The apparatus of claim 10, wherein saving the pre-calculated object identifier includes saving the pre-calculated object identifier in a table of pre-calculated object identifiers, whereby pre-calculated object identifiers can be saved for more than one series of related requests.

* * * * *